United States Patent
Östreicher et al.

(10) Patent No.: US 10,330,546 B2
(45) Date of Patent: Jun. 25, 2019

(54) METHOD FOR TESTING BRAKE SYSTEMS OF MOTOR VEHICLES

(71) Applicant: DÜRR SOMAC GmbH, Stollberg (DE)

(72) Inventors: Michael Östreicher, Bernsbach (DE); Michael Schultheis, Zwickau (DE)

(73) Assignee: DÜRR SOMAC GmbH, Stollberg (DE)

( * ) Notice: Subject to any disclaimer, the term of this patent is extended or adjusted under 35 U.S.C. 154(b) by 79 days.

(21) Appl. No.: 15/312,077

(22) PCT Filed: May 20, 2015

(86) PCT No.: PCT/DE2015/000253
§ 371 (c)(1),
(2) Date: Nov. 17, 2016

(87) PCT Pub. No.: WO2015/180702
PCT Pub. Date: Dec. 3, 2015

(65) Prior Publication Data
US 2017/0082511 A1   Mar. 23, 2017

(30) Foreign Application Priority Data

May 28, 2014  (DE) ........................ 10 2014 008 039

(51) Int. Cl.
*G01L 5/28* (2006.01)
*B60T 17/22* (2006.01)

(52) U.S. Cl.
CPC ................ *G01L 5/28* (2013.01); *B60T 17/22* (2013.01)

(58) Field of Classification Search
CPC ................................... G01L 5/28; B60T 17/22
See application file for complete search history.

(56) References Cited

U.S. PATENT DOCUMENTS

| | | | |
|---|---|---|---|
| 5,299,668 A * | 4/1994 | Youngers | B60T 17/223 188/352 |
| 6,363,774 B2 * | 4/2002 | Duff | B60T 17/221 340/605 |

(Continued)

FOREIGN PATENT DOCUMENTS

| | | |
|---|---|---|
| DE | 2250728 C2 | 10/1974 |
| DE | 4424094 C1 | 11/1995 |

(Continued)

OTHER PUBLICATIONS

International Search Report (German and English) for PCT/DE2015/000253, ISA/EP, Rijswijk, NL, dated Nov. 16, 2015.

(Continued)

*Primary Examiner* — Freddie Kirkland, III
(74) *Attorney, Agent, or Firm* — Harness, Dickey & Pierce, P.L.C.

(57) ABSTRACT

A system for testing brake systems of motor vehicles at assembly lines of automobile manufacturers, wherein the brake pedal is operated using an automatically controlled device and wherein the pedal travel and pedal force are measured using associated instruments is disclosed. A travel-force curve is determined based on pedal travel and pedal force during pedal movement, which is analyzed using a physical brake system model. The brake system model isolates design influences of the individual components. Furthermore, the travel difference between different benchmarks of various vehicles is taken into consideration when calculating the pedal travel to compensate the variable influence of the running clearance on pedal travel.

5 Claims, 1 Drawing Sheet

(56) References Cited

U.S. PATENT DOCUMENTS

| | | | | |
|---|---|---|---|---|
| 6,736,003 | B2* | 5/2004 | Takeda | G01N 19/02 |
| | | | | 73/132 |
| 7,021,131 | B2* | 4/2006 | Harrison | G01L 5/28 |
| | | | | 73/132 |
| 7,543,505 | B2* | 6/2009 | Hofsaess | B60T 7/042 |
| | | | | 73/779 |
| 8,670,896 | B2* | 3/2014 | Hodorek | G01B 3/56 |
| | | | | 701/32.8 |
| 9,103,737 | B2* | 8/2015 | Vaeretti | G01L 5/28 |
| 9,156,460 | B2* | 10/2015 | Clark | B60T 17/22 |
| 2008/0092669 | A1 | 4/2008 | Hofsaess | |
| 2010/0188203 | A1* | 7/2010 | Wallace | B60Q 11/00 |
| | | | | 340/454 |
| 2010/0292889 | A1* | 11/2010 | Cahill | B60T 8/1703 |
| | | | | 701/29.1 |
| 2013/0205882 | A1* | 8/2013 | Neu | B60T 17/223 |
| | | | | 73/132 |
| 2014/0250995 | A1* | 9/2014 | Vaeretti | B60T 17/223 |
| | | | | 73/132 |

FOREIGN PATENT DOCUMENTS

| | | |
|---|---|---|
| DE | 10009168 A1 | 9/2001 |
| DE | 102010021577 A1 | 11/2011 |

OTHER PUBLICATIONS

Written Opinion of the ISA (German) for PCT/DE2015/000253, ISA/EP, Rijswijk, NL, dated Nov. 16, 2015.

* cited by examiner

Travel-force curve
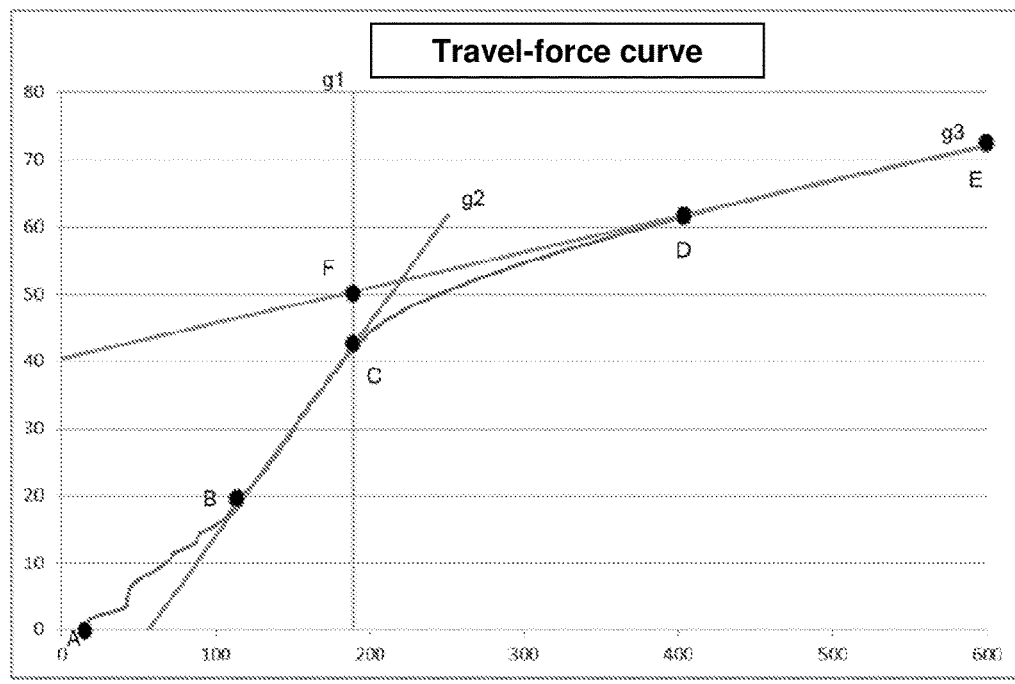

METHOD FOR TESTING BRAKE SYSTEMS OF MOTOR VEHICLES

CROSS-REFERENCE TO RELATED APPLICATIONS

This application is a 371 U.S. National Stage of International Application No. PCT/DE2015/000253, filed May 20, 2015, which claims the benefit of and priority to German Patent Application No. 102014008039.0, filed May 29, 2014. The entire disclosures of the above applications are incorporated herein by reference.

FIELD

The invention relates to a method for testing brake systems of motor vehicles during the manufacturing process at assembly lines of automobile manufacturers, wherein the brake pedal is operated using an automatically controlled device and wherein the pedal travel and pedal force are measured using associated instruments.

BACKGROUND

Brake systems of motor vehicles are safety-relevant assemblies and have to be checked regularly, both in the manufacturing process at the automobile manufacturer's plant and during later inspections of the vehicle. The brake systems are tested during manufacturing, particularly after they have been filled with operating fluids. It is the purpose of the test to detect any existing leaks or entrapped air in the system. At the same time, the tests are to ensure a defined position of the pedal system and easy operation of the moving parts in the brake system. Various technical solutions for such tests are known from prior art.

DE 100 09 168 A1, for example, describes a device with magnetically sensitive components for detecting a pedal operating force applied by the driver. The device includes a carrier plate with an associated tongue element which is mounted to the brake pedal using bolts. When the driver's foot applies a force to the brake pedal, the relative position between the tongue element and the carrier plate changes. Therefore the magnetic field that is present in this area also changes depending on the force applied to the pedal. This allows a statement about the pedal operating force, but without capturing the pedal travel.

DE 44 24 094 C1 however discloses a device, the application of which also considers pedal travel. A sensor that is connected to an evaluation unit detects pedal movements.

DE 2 250 728 C describes a pedal force meter that includes a housing, a step plate to which a pedal operating force can be applied, and a device for outputting a signal depending on the pedal operating force. The housing includes a base plate designed as an adapter with which the entire device can be detachably attached to the brake pedal. The base plate forms a contour together with a circumferential frame that is closed at the top by the step plate. Measuring elements are arranged in the interior to determine the application of force to the pedal plate.

A measuring device known from design registration DE 403 06 723.5 includes force and travel sensors and performs activations of the brake pedal. In a first preset stroke, the brake system is first prepared for the test. In a subsequent measuring stroke, a travel-force characteristic is recorded from which the device determines a pedal travel at a test force. This characteristic allows the detection of any disruptions, e.g. air entrapped in the hydraulic system or a malfunction of an assembly. Then a leak test is performed to evaluate if the brake system is leaking or not.

Although various technical solutions for testing brake systems of motor vehicles are known, there continues to be a need for development. A major aspect is that the evaluation of the brake systems using the common brake pedal testing equipment has been limited to evaluating pedal travels and pedal forces with respect to any residual air or leakage when operating the brake pedal. But such evaluation has yet to take into account that the respective brake pedal travel is the sum total of a multitude of design factors that influence the brake system components. The residual air that is primarily detected is just one of the influencing factors.

Therefore the formerly common method of evaluating the residual air inevitably resulted in a high proportion of false evaluations, which can either be a false "not ok" (hereinafter called "NOK") or a false "ok" (hereinafter called "OK"). Accordingly, vehicles are either unnecessarily taken off the assembly line for reworking due to a false NOK rating, or they are rated OK despite an inadmissibly high proportion of residual air and not reworked. Studies by the applicant have shown that this proportion can be up to 30%, wherein the percentage of actually accurate evaluations as NOK is typically smaller than 1%.

SUMMARY

The task underlying the present invention is to provide a method for testing brake systems of motor vehicles with which the percentage of a false NOK or OK evaluation can be considerably reduced. For this purpose, a generally known brake pedal test using automatic application of a force to the brake pedal and measuring pedal travel and pedal force is to be modified such that the proportion of false NOK evaluations regarding residual air can be considerably reduced and the proportion of false OK evaluations can at least be reduced to a negligible percentage.

This problem is solved using the technical features according to claim 1 in that a travel-force curve is determined based on pedal travel and pedal force during pedal movement, which is analyzed using a physical brake system model that isolates design influences of the individual components. The travel-force curve is divided into a first section in which only the components of the pedal mechanism move, a second, mainly linear section in which the brake master cylinder is set into motion, a third curved section and a fourth, mainly linear section that is described as the straight line "g3". At the transition from the second to the third section, a benchmark calculated from the shape of the curve is determined through which a vertical straight line "g1" is routed. A junction point is determined at the intersection of the line "g1" and the line "g3", and the area that forms between two selected points is calculated as an evaluation parameter for the brake system. Furthermore, the travel difference between different benchmarks of various vehicles is taken into consideration when calculating the pedal travel. This can be used to compensate the variable influence of the running clearance on the pedal travel. Further details and features of the invention are described in an exemplary embodiment.

In terms of the evaluation, this method sequence results in an isolation of the contributions of major components of the brake system to the pedal travel. This allows a separate evaluation of residual air, brake system hydromechanics, and running clearance. The so far inevitable mutual compensation of various technical influences on the pedal travel is excluded, which considerably reduces false evaluations.

Particularly the running clearance at the brake discs can easily be evaluated and adjusted, if required. Furthermore, the brake system will detect if any subsequent bleeding is required. A characteristic of the brake pedal that was only subjectively felt by the driver (particularly the time delay until the running clearance is overcome and the brake effect sets in) can be objectively detected and monitored using this method.

The method according to the invention increases the achievable detection rate of brake systems which really have to be rated NOK. This translates into considerable advantages for automobile manufacturers because it eliminates cost-intensive reworking due to false NOK ratings. Such reworking is only triggered now if there are actual defects.

At the same time, a correct OK rating is also very important for a car manufacturer because it helps prevent most quality defects that impair both vehicle safety and the manufacturer's image. Automobile manufacturers can use this improved quality of the brake pedal test for monitoring the quality of supplied brake components as well. The brake pedal test is thus gaining significance for documenting the operational safety of the entire brake system.

DRAWINGS

An embodiment of the invention is explained in more detail below with reference to the drawing.

FIG. 1 shows the typical travel-force curve of a brake pedal test from the running production of an automobile manufacturer.

DETAILED DESCRIPTION

In FIG. 1, in the section of the curve between points A and B, only components of the pedal mechanism including the brake booster move, but without booster effect.

The brake master cylinder is set into motion between points B and C. The brake linings have not made contact yet, so that no significant hydraulic pressure can be built up either. Movement is almost linear. However, the movement of the brake seals is visible in this section. If sufficient measuring points can be found in a linear context, this section is described by a straight line "g2". The criterion for these measuring points is a defined correlation.

In its further progression, the travel-force curve transitions into a curved section. Benchmark C is determined by the beginning of the significant curvature of this travel-force curve towards point D. Point C is that point in the curve progression at which the hydraulic pressure increases noticeably. The straight line "g1" that passes vertically through benchmark C is important for determining the nominal curve.

The curve pairs (travel, force) are sufficiently linear in the curve section between points D and E to describe this section as straight line "g3". The criterion used is a linear correlation (>0.99). The straight line has a slope "a", wherein "a" describes the "elasticity" of the hydromechanics of the brake system. It is also an objective measure for the "hardness" of the brake.

The curvature of the curve in the section between points C and D is ultimately the sum total of multiple effects when increasing the pedal force. In normal operation such effects are, for example, uneven contact of the brake linings and compression of existing residual air. A calculation of the area forming between points C, E, and F has proven its worth to obtain a result that can be practically evaluated.

The physical brake system model proposed here describes the section between points B and C as a running clearance, i.e. as the pedal travel range in which the brake linings move towards the brake disc without generating a noticeable hydraulic pressure in the brake system. It is apparent from the figure that the running clearance as part of the pedal travel influences the result and has to be included in an evaluation of the residual air based on the pedal travel. This approach to the solution is practically implemented by the proposed process flow.

The applicant can state after first in-house tests that the process flow developed is operational. The running clearance was evaluated based on a test series of almost 3,800 vehicles. The rate of NOK ratings detected in advance for the pedal travel was 0.8% at a tolerance range of +/−7 mm. This would amount to 29 vehicles. The NOK rate using the novel type of running clearance calculation is only 0.2% or 9 vehicles. It was therefore not necessary to take the 29 vehicles first detected off for reworking, but just 9 vehicles. The reworking that was actually required was thus reduced by a total of 20 vehicles.

The invention claimed is:

1. A method for testing brake systems of motor vehicles in a manufacturing process at assembly lines of automobile manufacturers, wherein a brake pedal is operated using an automatically controlled device and wherein a pedal travel and pedal force are measured using associated instruments, wherein
   a travel-force curve is determined based on the pedal travel and pedal force during pedal movement which is analyzed using a physical brake system model;
   wherein the physical brake system model isolates design influences by individual components of the brake system by dividing the travel-force curve into a first section (AB) in which only components of a brake mechanism are moving, a second, mostly linear section (BC), in which a brake master cylinder is set in motion, wherein this section is described by a straight line "g2", a third, curved section (CD), and a fourth, mostly linear section (DE), wherein this section is described by a straight line "g3";
   wherein a benchmark calculated from a shape of a curve, through which a vertical straight line "g1" is routed, is determined at a transition from the second to the third section;
   wherein a junction "F" is determined at an intersection of the vertical straight line "g1" and the straight line "g3";
   wherein an area that is formed between points "C-E-F" is calculated as an evaluation parameter for the brake system; and
   wherein a travel difference between different benchmarks of various vehicles is taken into consideration when calculating the pedal travel.

2. The method according to claim 1, wherein a specified correlation is a criterion for measuring points of the straight line "g2".

3. The method according to claim 1, wherein a linear correlation is a criterion for measuring points of the straight line "g3".

4. A method for testing a brake system of a vehicle, comprising:
   operating a brake pedal of the vehicle using an automatically controlled device;
   measuring a movement of the brake pedal and a corresponding force applied to the brake pedal during movement of the brake pedal;

determining a travel-force curve based on the measurements; and
correlating an area within the travel-force curve to an amount of residual air trapped in the brake system by:
dividing the travel-force curve into (i) a first section (AB) in which only components of the brake system move, (ii) a second section (BC) in which a brake master cylinder is set into motion, (iii) a third section (CD) that corresponds to contact with a brake lining and compression of residual air, and a fourth section (DE) that corresponds to elasticity of the brake system, wherein (E) is a terminal end of the movement of the brake pedal;
fitting a second line (g2) to the second section (BC) of the travel-force curve;
fitting a third line (g3) to the fourth section (DE) of the travel-force curve;
plotting a first line (g1) through a transition point (C) of the travel-force curve, wherein the transition point (C) is formed between the second section (BC) and the third section (CD);
determining an intersection (F) between the first line (g1) and the third line (g3); and
calculating the area bounded by the first line (g1) between the transition point (C) and the intersection (F), the third line (g3) between the intersection (F) and (E), the third section (CD), and the fourth section (DE).

5. A method for testing a brake system of a vehicle, comprising:
operating a brake pedal of the vehicle using an automatically controlled device;
measuring a movement of the brake pedal and a corresponding force applied to the brake pedal during movement of the brake pedal;
determining a travel-force curve based on the measurements; and
analyzing the travel-force curve using a physical brake system model including isolating design influences of individual components of the brake system by:
dividing the travel-force curve into (i) a first section (AB) in which only components of the brake system move, (ii) a second section (BC) in which a brake master cylinder is set into motion, (iii) a third section (CD) that corresponds to contact with a brake lining and compression of residual air, and a fourth section (DE) that corresponds to elasticity of the brake system, wherein (E) is a terminal end of the movement of the brake pedal;
fitting a second line (g2) to the second section (BC) of the travel-force curve;
fitting a third line (g3) to the fourth section (DE) of the travel-force curve;
plotting a first line (g1) through a transition point (C) of the travel-force curve, wherein the transition point (C) is formed between the second section (BC) and the third section (CD);
determining an intersection (F) between the first line (g1) and the third line (g3);
calculating an area bounded by the first line (g1) between the transition point (C) and the intersection (F), the third line (g3) between the intersection (F) and (E), the third section (CD), and the fourth section (DE); and
correlating the area to an amount of residual air trapped in the brake system.

* * * * *